United States Patent
Albertson et al.

(10) Patent No.: US 7,198,022 B2
(45) Date of Patent: Apr. 3, 2007

(54) COMPENSATING DISPLACEMENT ON DEMAND SYSTEM RESPONSE OFFSET DUE TO AGING

(75) Inventors: William C. Albertson, Clinton Township, MI (US); Mike M. Mc Donald, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 28 days.

(21) Appl. No.: 11/060,947

(22) Filed: Feb. 18, 2005

(65) Prior Publication Data

US 2006/0185641 A1    Aug. 24, 2006

(51) Int. Cl.
*F02D 17/02*    (2006.01)

(52) U.S. Cl. .................................. 123/198 F

(58) Field of Classification Search ............ 123/198 F, 123/481, 90.15, 90.16, 90.17
See application file for complete search history.

(56) References Cited

U.S. PATENT DOCUMENTS 6,752,121 B2 * 6/2004 Rayl et al. ............... 123/198 F
2002/0189575 A1 12/2002 Rayl et al.

* cited by examiner

*Primary Examiner*—Stephen K. Cronin
*Assistant Examiner*—Hyder Ali
(74) *Attorney, Agent, or Firm*—Christopher DeVries (57) ABSTRACT

A response time compensation system for controlling engine operation in activated and deactivated modes in a displacement on demand engine includes a LOMA system that regulates pressurized fluid flow to switch engine operation between the activated and the deactivated modes and a count module that monitors a cycle count of the LOMA system. A response factor module determines a response factor of the LOMA system based on the cycle count and a compensation module generates a compensated response time of the LOMA system based on the response factor.

21 Claims, 6 Drawing Sheets

COMPENSATING DISPLACEMENT ON DEMAND SYSTEM RESPONSE OFFSET DUE TO AGING

FIELD OF THE INVENTION

The present invention relates to internal combustion engines, and more particularly to engine control systems that control engine operation in a displacement on demand engine.

BACKGROUND OF THE INVENTION

Some internal combustion engines include engine control systems that deactivate cylinders under specific low load operating conditions. For example, an eight cylinder engine can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active).

In the deactivated mode, there are fewer firing cylinders. As a result, there is less drive torque available to drive the vehicle driveline and accessories (e.g., alternator, coolant pump, A/C compressor). Engine efficiency, however, is increased as a result of decreased air pumping losses due to the deactivated cylinders not taking in and compressing fresh intake air.

A lifter oil manifold assembly (LOMA) is implemented to activate and deactivate select cylinders of the engine. The LOMA includes a series of lifters and solenoids associated with corresponding cylinders. The solenoids are selectively energized to enable hydraulic fluid flow to the lifters to inhibit valve lifter operation, thereby deactivating the corresponding cylinders.

A control system generates LOMA system response time estimates based on the physical properties of the solenoids, the hydraulic system, the lifters and other LOMA components. The response time estimates are implemented to inhibit mistiming errors when activating and deactivating cylinders. Traditionally, the response time estimates are based on test or timing data generated using a simulation or actual LOMA system testing. The test or timing data, however, does not account for response time variance that occurs as a result of component aging.

SUMMARY OF THE INVENTION

Accordingly, the present invention provides a response time compensation system for controlling engine operation in activated and deactivated modes in a displacement on demand engine. The response time compensation system includes a lifter oil manifold assembly (LOMA) system that regulates pressurized fluid flow to switch engine operation between the activated and the deactivated modes and a count module that monitors a cycle count of the LOMA system. A response factor module determines a response factor of the LOMA system based on the cycle count and a compensation module generates a compensated response time of the LOMA system based on the response factor.

In one feature, the response factor is determined from a look-up table based on the cycle count.

In another feature, a response time estimation module generates an estimated response time. The compensation module determines the compensated response time as a product of the response factor and the estimated response time.

In another feature, a control module regulates operation of the LOMA system based on the compensated response time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
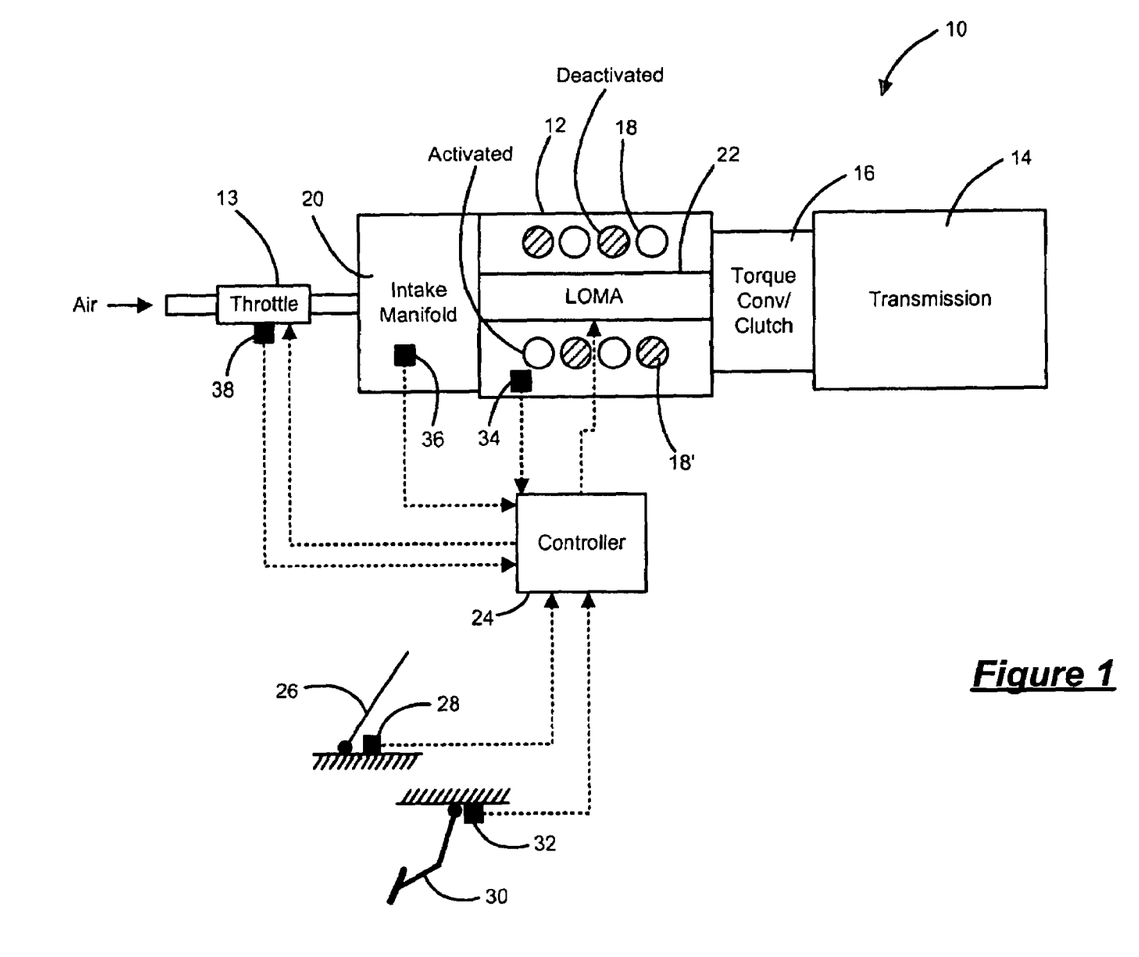
FIG. 1 is a functional block diagram illustrating a vehicle powertrain including a displacement on demand (DOD) engine control system according to the present invention.

Referring now to FIG. 1, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. One or more select cylinders 18' are selectively deactivated during engine operation. Although FIG. 1 depicts eight cylinders (N=8), it is appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The engine also includes a lifter oil manifold assembly (LOMA) 22 that deactivates the select cylinders 18', as described in further detail below.

A controller 24 communicates with the engine 12 and various inputs and sensors as discussed herein. A vehicle operator manipulates an accelerator pedal 26 to regulate the throttle 13. More particularly, a pedal position sensor 28 generates a pedal position signal that is communicated to the controller 24. The controller 24 generates a throttle control signal based on the pedal position signal. A throttle actuator (not shown) adjusts the throttle 13 based on the throttle control signal to regulate air flow into the engine 12.

The vehicle operator manipulates a brake pedal 30 to regulate vehicle braking. More particularly, a brake position sensor 32 generates a brake pedal position signal that is communicated to the controller 24. The controller 24 generates a brake control signal based on the brake pedal position signal. A brake system (not shown) adjusts vehicle braking based on the brake control signal to regulate vehicle speed. An engine speed sensor 34 generates a signal based on engine speed. An intake manifold absolute pressure (MAP) sensor 36 generates a signal based on a pressure of the intake manifold 20. A throttle position sensor (TPS) 38 generates a signal based on throttle position.

When the engine 12 enters an operating point to enable the deactivated mode, the controller 24 transitions the engine 12 to the deactivated mode. In an exemplary embodiment, N/2 cylinders 18 are deactivated, although one or more cylinders may be deactivated. Upon deactivation of the select cylinders 18', the controller 24 increases the power output of the remaining or activated cylinders 18. The inlet and exhaust ports (not shown) of the deactivated cylinders 18' are closed to reduce pumping losses.

The engine load is determined based on the intake MAP, cylinder mode and engine speed. More particularly, if the MAP is below a threshold level for a given RPM, the engine load is deemed light and the engine 12 could possibly be operated in the deactivated mode. If the MAP is above the threshold level for the given RPM, the engine load is deemed heavy and the engine 12 is operated in the activated mode. The controller 24 controls the LOMA 22 based on the solenoid control, as discussed in further detail below.

Figure 2:
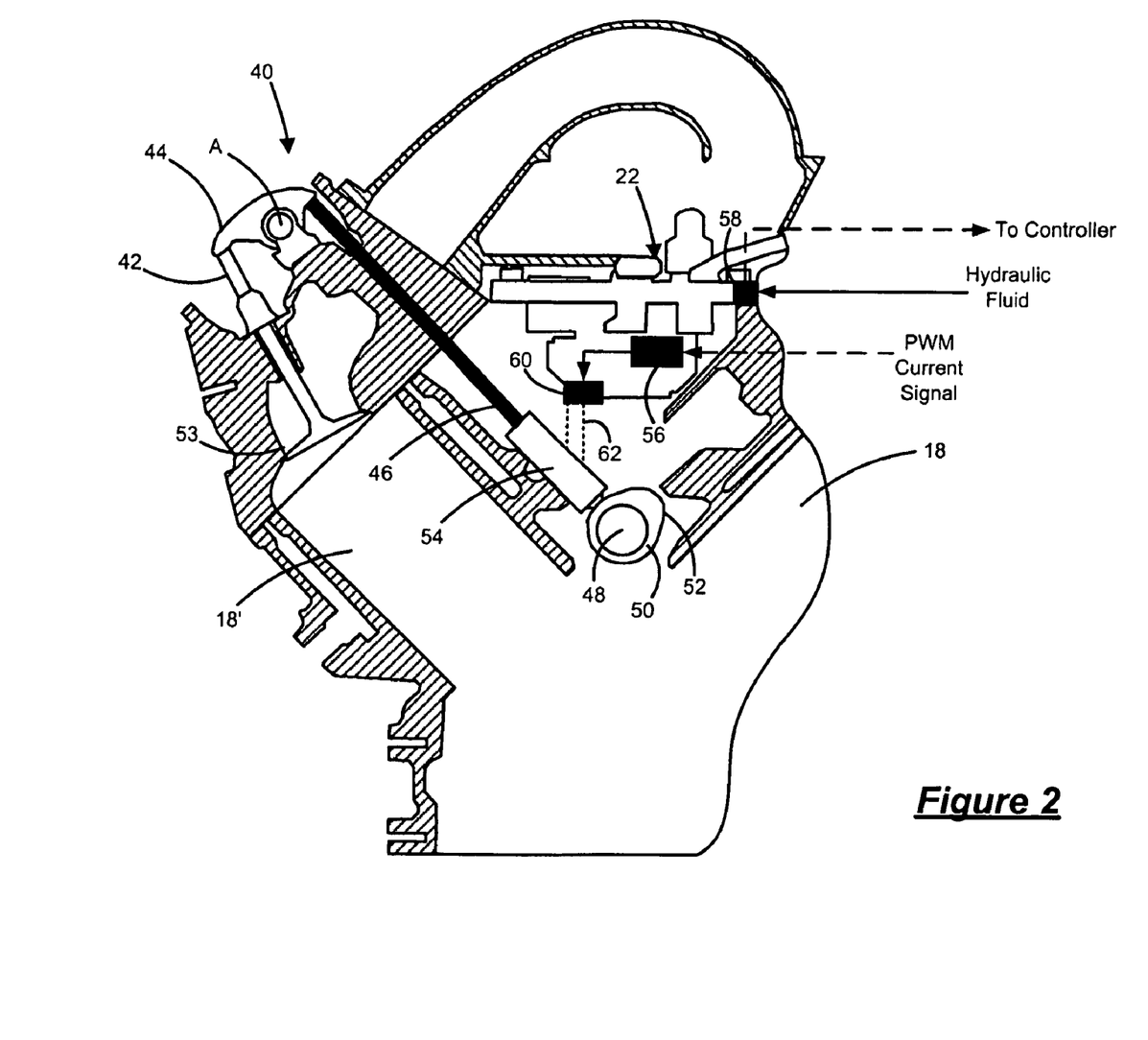
FIG. 2 is a partial cross-sectional view of the DOD engine illustrating a lifter oil manifold assembly (LOMA) and an intake valvetrain.

Referring now to FIG. 2, an intake valvetrain 40 of the engine 12 includes an intake valve 42, a rocker 44 and a pushrod 46 associated with each cylinder 18. The engine 12 includes a rotatably driven camshaft 48 having a plurality of valve cams 50 disposed therealong. A cam surface 52 of the valve cams 50 engage lifters, discussed in detail below, and the pushrods 46 to cyclically open and close intake ports 53 within which the intake valves 42 are positioned. The intake valve 42 is biased to a closed position by a biasing member (not illustrated) such as a spring. As a result, the biasing force is transferred through the rocker 44 to the pushrod 46, causing the pushrod 46 to press against the cam surface 52.

As the camshaft 48 is caused to rotate, the valve cam 50 induces linear motion of the corresponding pushrod 46. As the pushrod 46 is induced to move outward, the rocker 44 is caused to pivot about an axis (A). Pivoting of the rocker 44 induces movement of the intake valve 42 toward an open position, thereby opening the intake port 53. The biasing force induces the intake valve 42 to the closed position as the camshaft 48 continues to rotate. In this manner, the intake port 53 is cyclically opened to enable air intake.

Although the intake valvetrain 40 of the engine 12 is illustrated in FIG. 2, it is appreciated that the engine 12 also includes an exhaust valvetrain (not shown) that operates in a similar manner. More specifically, the exhaust valvetrain includes an exhaust valve, a rocker and a pushrod associated with each cylinder 18. Rotation of the camshaft 48 induces reciprocal motion of the exhaust valves to open and close associated exhaust ports, as similarly described above for the intake valvetrain.

The LOMA 22 provides pressurized fluid to a plurality of lifters 54 and includes solenoids 56 (shown schematically) associated with select cylinders 18' (see FIG. 1). The select cylinders 18' are those that are deactivated when operating the engine 12 in the deactivated mode. The lifters 54 are disposed within the intake and exhaust valvetrains to provide an interface between the cams 50 and the pushrods 46. More specifically, the lifters 54 selectively induce linear motion in the corresponding pushrods 46. In general, there are two lifters 54 provided for each select cylinder 18' (one lifter for the intake valve 42 and one lifter for the exhaust valve). It is anticipated, however, that more lifters 54 can be associated with each select cylinder 18' (i.e., multiple inlet or exhaust valves per cylinder 18'). The LOMA 22 further requires a pressure sensor 58 that generates a pressure signal indicating a pressure of a hydraulic fluid supply to the LOMA 22. It is anticipated that one or more pressure sensors 22 can be implemented.

Each lifter 54 associated with the select cylinders 18' is hydraulically actuated between first and second modes. The first and second modes respectively correspond to the activated and deactivated modes. In the first mode, the lifter 54 provides a mechanical connection between the cam 50 and the pushrod 46. In this manner, the cam 50 induces linear motion of the lifter 54, which is transferred to the pushrod 46. In the second mode, the lifter 54 functions as a buffer to provide a mechanical disconnect between the cam 50 and the pushrod 46. Although the cam 50 induces linear motion of the lifter 54, the linear motion is not transferred to the pushrod 46. A more detailed description of the lifters 54 is presently foregone as lifters and their operation are known to those of skill in the art.

The solenoids 56 selectively enable hydraulic fluid flow to the lifters 54 to switch the lifters 54 between the first and second modes. Although there is generally one solenoid 56 associated with each select cylinder 18' (i.e., one solenoid for two lifters), it is anticipated that more or fewer solenoids 56 can be implemented. Each solenoid 56 actuates an associated valve 60 (shown schematically) between open and closed positions. In the closed position, the valve 60 inhibits pressurized hydraulic fluid flow to the corresponding lifters 54. In the open position, the valve 60 enables pressurized fluid flow to the corresponding lifters 54 via a fluid passage 62. The pressurized hydraulic fluid flow is provided to the LOMA 22 from a pressurized hydraulic fluid source.

Although not illustrated, a brief description of an exemplary solenoid is provided herein to provide a better understanding of the present invention. The solenoids 56 generally include an electromagnetic coil and a plunger that is disposed coaxially within the coil. The plunger provides a mechanical interface between the solenoid 56 and a mechanical element, such as the valve 60. The plunger is biased to a first position relative to the coil by a biasing force. The biasing force can be imparted by a biasing member, such as a spring, or by a pressurized fluid. The solenoid 56 is energized by supplying current to the coil, which induces magnetic force along the coil axis. The magnetic force induces linear movement of the plunger to a second position. In the first position, the plunger holds the valve 60 in its closed position to inhibit pressurized hydraulic fluid flow to the corresponding lifters. In the second position, the plunger actuates the valve 60 to its open position to enable pressurized hydraulic fluid flow to the corresponding lifters.

The response time compensation control system of the present invention compensates an estimated system response time ($RT_{EST}$) for variance as a result of LOMA component aging. $RT_{EST}$ is defined as the time delay between commanding the solenoid 56 to change its state (i.e., energized/de-energized), until the corresponding lifter 54 changes its mode (i.e., activated/de-activated). More specifically, the response time compensation control determines a response factor (RF) based on a cycle count of the LOMA 22. $R_{TEST}$ is multiplied by RF to provide a compensated response time ($RT_{COMP}$). Switching of the engine 12 between activated and deactivated modes is regulated based on $RT_{COMP}$. $RT_{EST}$ is determined based on $RT_{SOLENOID}$, a hydraulic system response time ($RT_{HYDRAULIC}$) and an actuator response time ($RT_{ACUATOR}$). An exemplary method of determining $RT_{EST}$ is disclosed in commonly assigned U.S. Pat. Pub. No. US 2002/0189575, filed on May 17, 2000 and published on Dec. 19, 2002, the disclosure of which is expressly incorporated herein by reference. In general, $RT_{EST}$ is determined based on a LOMA system voltage ($V_{SYS}$), hydraulic oil pressure ($P_{OIL}$) and hydraulic oil temperature ($T_{OIL}$).

Figure 3:
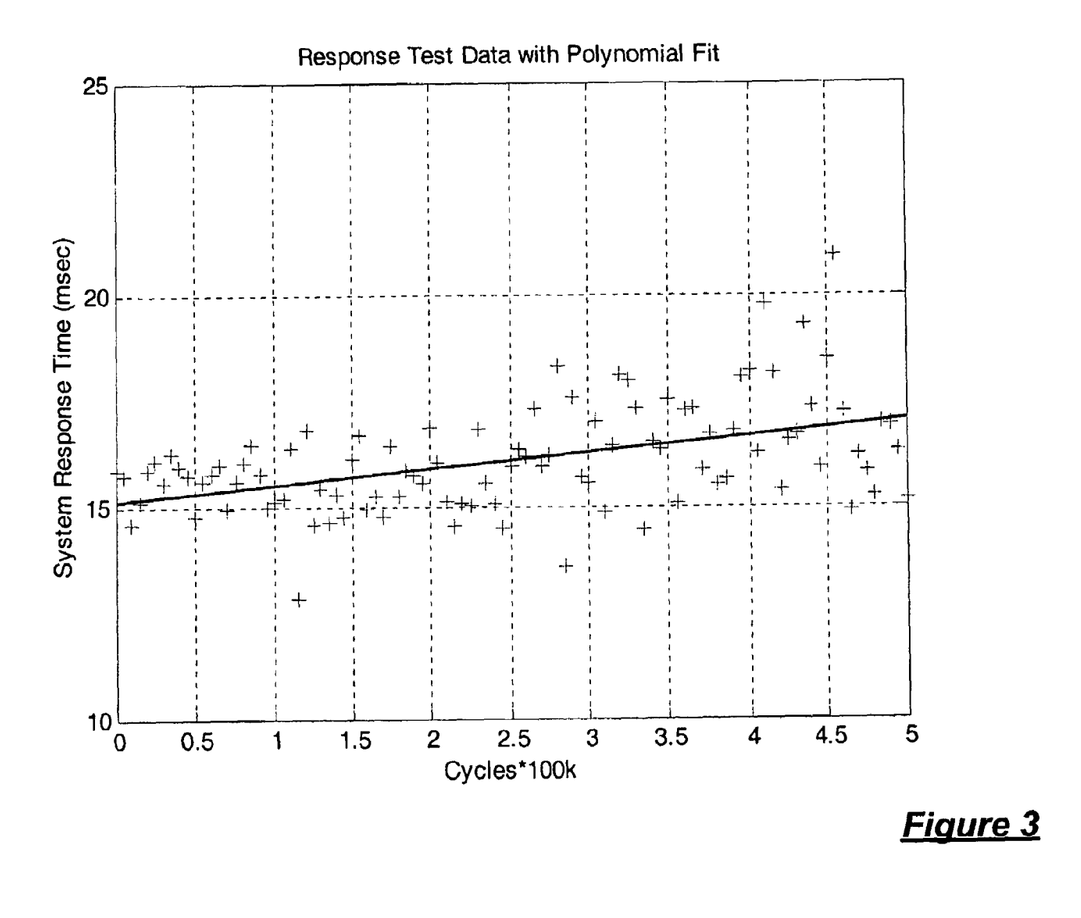
FIG. 3 is a graph illustrating response time test data for an exemplary LOMA system.
Figure 4:
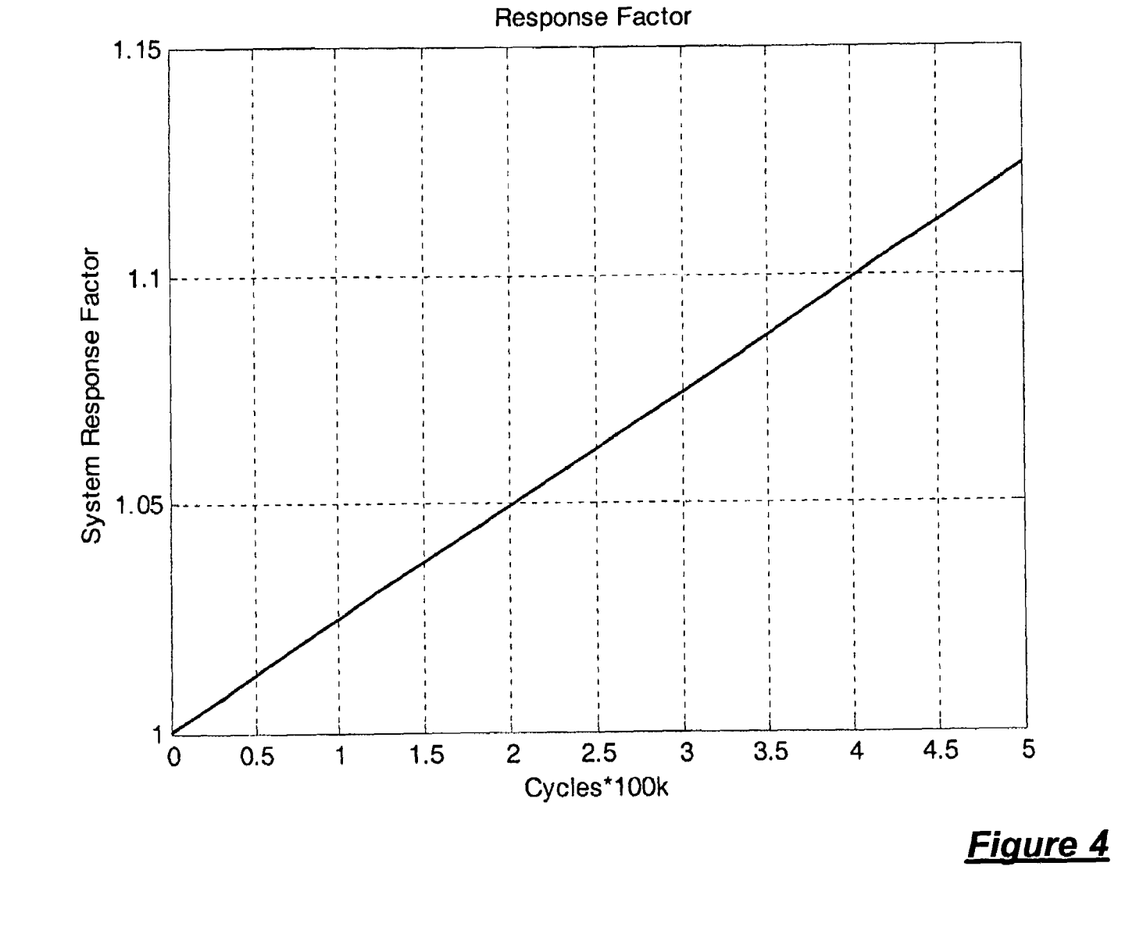
FIG. 4 is a graph illustrating a response factor implemented by the response time compensation control of the present invention.

Referring now to FIGS. 3 and 4, $RT_{FACTOR}$ is determined based on test data using an equivalent LOMA system. More specifically, the response time of a laboratory-based LOMA system is monitored over a significant number of cycles (e.g., 500,000 cycles). The laboratory-based LOMA system includes a solenoid that is of the same type or that is otherwise equivalent to the solenoid 56. One cycle is preferably defined as the solenoid switching from a de-energized state to an energized state or vice-versa. The response time for the laboratory-based LOMA system is plotted over the cycles (see FIG. 3). The response time data is fit to a polynomial data fit. As illustrated in FIG. 4, the polynomial data fit is normalized to provide a response factor (RF) of 1.00 for 0-cycles. 0-cycles indicates a part that has undergone a small number of cycles. It is anticipated that a look-up table can be developed based on the normalized polynomial data fit, to provide RF given a particular cycle count. It is also anticipated that RF can be calculated from the equation that defines the polynomial data fit based on a particular cycle count.

It is anticipated that the response time compensation control system of the present invention can compensate the estimated response time when switching from the de-energized state to the energized state ($RT_{ESTENG}$) as well as compensating the estimated response time when switching from the energized state to the de-energized state ($RT_{ESTDENG}$). More specifically, when compensating $RT_{ESTENG}$, the response time compensation control system implements an energized response factor ($RF_{ENG}$). When compensating $RT_{ESTDENG}$, the response time compensation control system implements a de-energized response factor ($RF_{DENG}$). $RF_{ENG}$ is determined as described above and using a first set of response time data representing switching from the de-energized state to the energized state. $RF_{DENG}$ is determined as described above and using a second set of response time data representing switching from the energized state to the de-energized state. In this manner, first and second look-up tables or first and second equations are used to determine respective response time factors based on a given cycle count.

Figure 5:
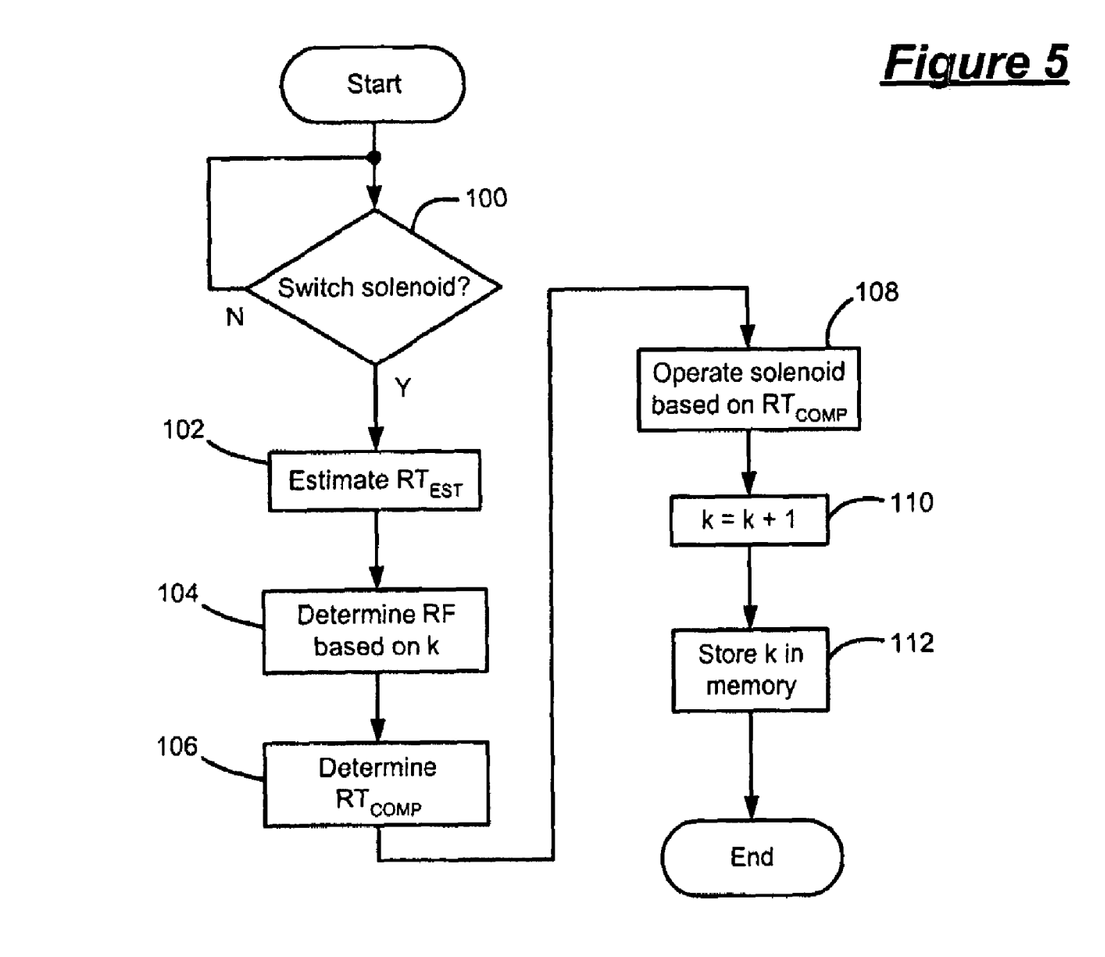
FIG. 5 is a flowchart illustrating the response time compensation control of the present invention.

Referring now to FIG. 5, exemplary steps executed by the response time compensation control system will be described in detail. In step 100, control determines whether the solenoid 56 is to be switched (i.e., from the energized state to the de-energized state or from the de-energized state to the energized state). If the solenoid is not to be switched, control loops back. If the solenoid is to be switched, control estimates $RT_{EST}$ in step 102. In step 104, control determines RF (e.g., $RF_{ENG}$, $RF_{DENG}$) based on a cycle count (k). k is a value that is updated and stored in memory as described in further detail below. In step 106, control determines $RT_{COMP}$ as the product of $RT_{EST}$ and RF. Control operates the solenoid based on $RT_{COMP}$ in step 108. In step 110, control increments k by 1. In step 112, control stores the updated value of k in memory and control ends.

Figure 6:
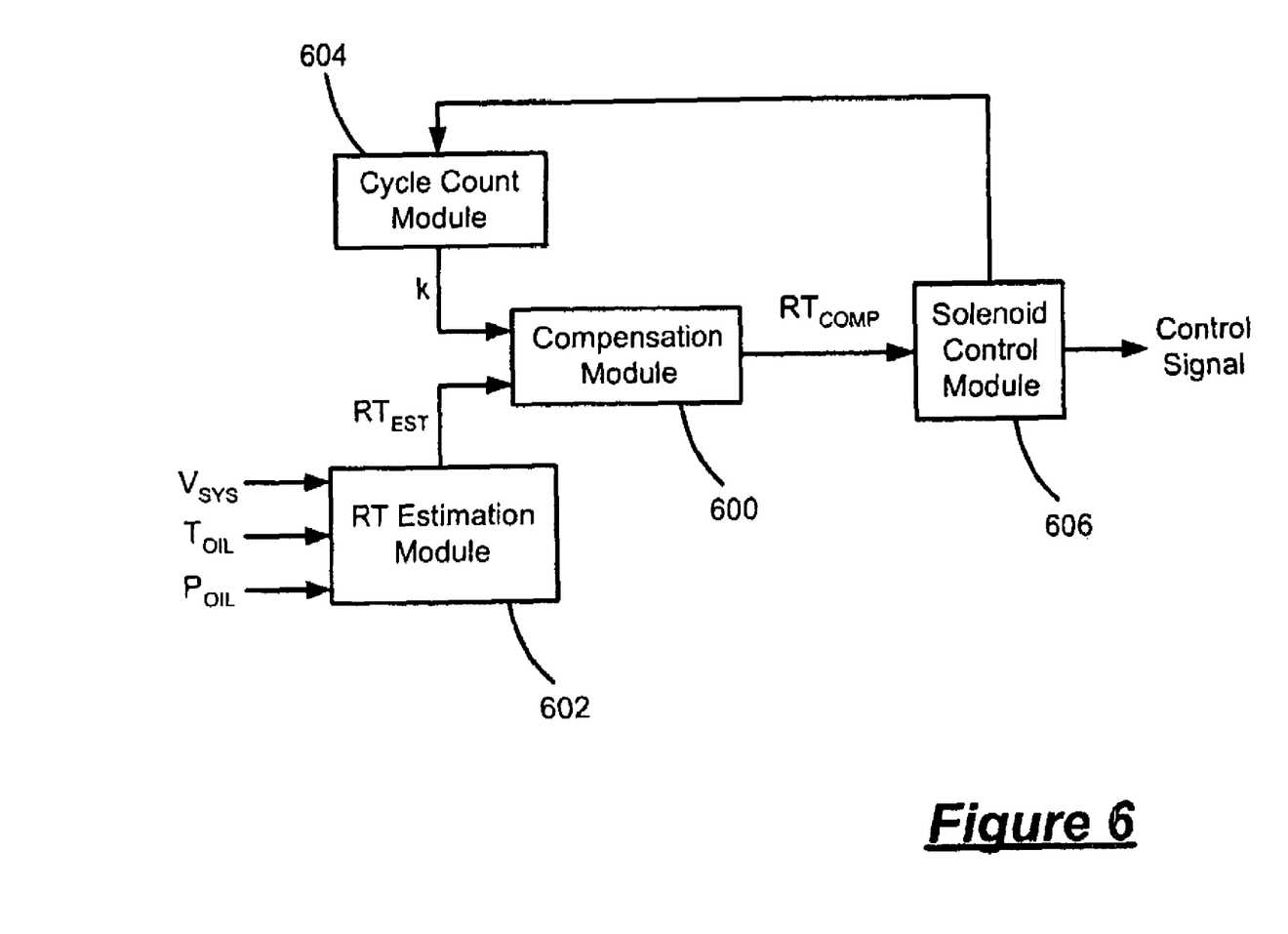
FIG. 6 is a functional block diagram illustrating exemplary module that execute the response time compensation control of the present invention.

Referring now to FIG. 6, the response time compensation control system can include multiple, exemplary modules. The modules include a compensation module 600, an RT estimation module 602, a cycle count module 604 and a solenoid control module 606. The compensation module 600 determines $RT_{COMP}$ based on k and $RT_{EST}$. The RT estimation module 602 determines $RT_{EST}$ based on a $V_{SYS}$, $T_{OIL}$ and $P_{OIL}$. The solenoid control module 606 generates a control signal based on $RT_{COMP}$ and sends an update signal to the cycle count module 604. The cycle count module 604 updates k based on the update signal.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A response time compensation system for controlling engine operation in activated and deactivated modes in a displacement on demand engine, comprising:
    a LOMA system that regulates pressurized fluid flow to switch engine operation between said activated and said deactivated modes;
    a count module that monitors a cycle count of said LOMA system;
    a response factor module that determines a response factor of said LOMA system based on said cycle count; and
    a compensation module that generates a compensated response time of said LOMA system based on said response factor.

2. The response time compensation system of claim 1 wherein said response factor is determined from a look-up table based on said cycle count.

3. The response time compensation system of claim 1 further comprising a response time estimation module that generates an estimated response time.

4. The response time compensation system of claim 3 wherein said compensation module determines said compensated response time as a product of said response factor and said estimated response time.

5. The response time compensation system of claim 1 further comprising a control module that regulates operation of said LOMA system based on said compensated response time.

6. An engine control system for controlling engine operation in activated and deactivated modes in a displacement on demand engine, comprising:
    a lifter oil manifold assembly (LOMA) system having a solenoid that regulates pressurized fluid flow to other components therein; and a control module that monitors a cycle count of said LOMA system, that determines a response factor based on said cycle count and that determines a compensated response time of said LOMA system based on said response factor.

7. The engine control system of claim 6 wherein said control module determines an estimated response time of said LOMA system.

8. The engine control system of claim 7 wherein said control module determines said compensated response time as a product of said response factor and said estimated response time.

9. The engine control system of claim 6 wherein said response factor is determined from a look-up table based on said cycle count.

10. The engine control system of claim 6 wherein said control module regulates operation of said LOMA system based on said compensated response time.

11. A method of controlling engine operation in activated and deactivated modes in a displacement on demand engine, comprising:
    monitoring a cycle count of a LOMA system that regulates pressurized fluid flow to switch engine operation between said activated and said deactivated modes;
    determining a response factor of said LOMA system based on said cycle count and
    generating a compensated response time of said LOMA system based on said response factor.

12. The method of claim 11 wherein said response factor is determined from a look-up table based on said cycle count.

13. The method of claim 11 further comprising determining an estimated response time.

14. The method of claim 13 wherein said compensated response time is determined as a product of said response factor and said estimated response time.

15. The method of claim 11 further comprising regulating operation of said LOMA system based on said compensated response time.

16. A method of compensating a system response time for a LOMA system that regulates engine operation in activated and deactivated modes in a displacement on demand engine, comprising:
    generating test data for an equivalent LOMA system;
    determining a relationship between a cycle count of said equivalent LOMA system and an equivalent response time of said equivalent LOMA system;
    monitoring a cycle count of said LOMA system;
    determining a response factor of said LOMA system based on said cycle count and said relationship; and
    generating a compensated response time of said LOMA system based on said response factor.

17. The method of claim 16 wherein said response factor is determined from a look-up table based on said cycle count.

18. The method of claim 17 further comprising generating said look-up table based on said relationship and said cycle count.

19. The method of claim 16 further comprising determining an estimated response time.

20. The method of claim 19 wherein said compensated response time is determined as a product of said response factor and said estimated response time.

21. The method of claim 16 further comprising regulating operation of said LOMA system based on said compensated response time.

* * * * *